No. 758,864. PATENTED MAY 3, 1904.
E. C. SHAW
APPARATUS FOR PREPARING, HANDLING, AND VULCANIZING TIRES OR OTHER RUBBER PRODUCTS.
APPLICATION FILED JUNE 17, 1903.
NO MODEL. 3 SHEETS—SHEET 2.
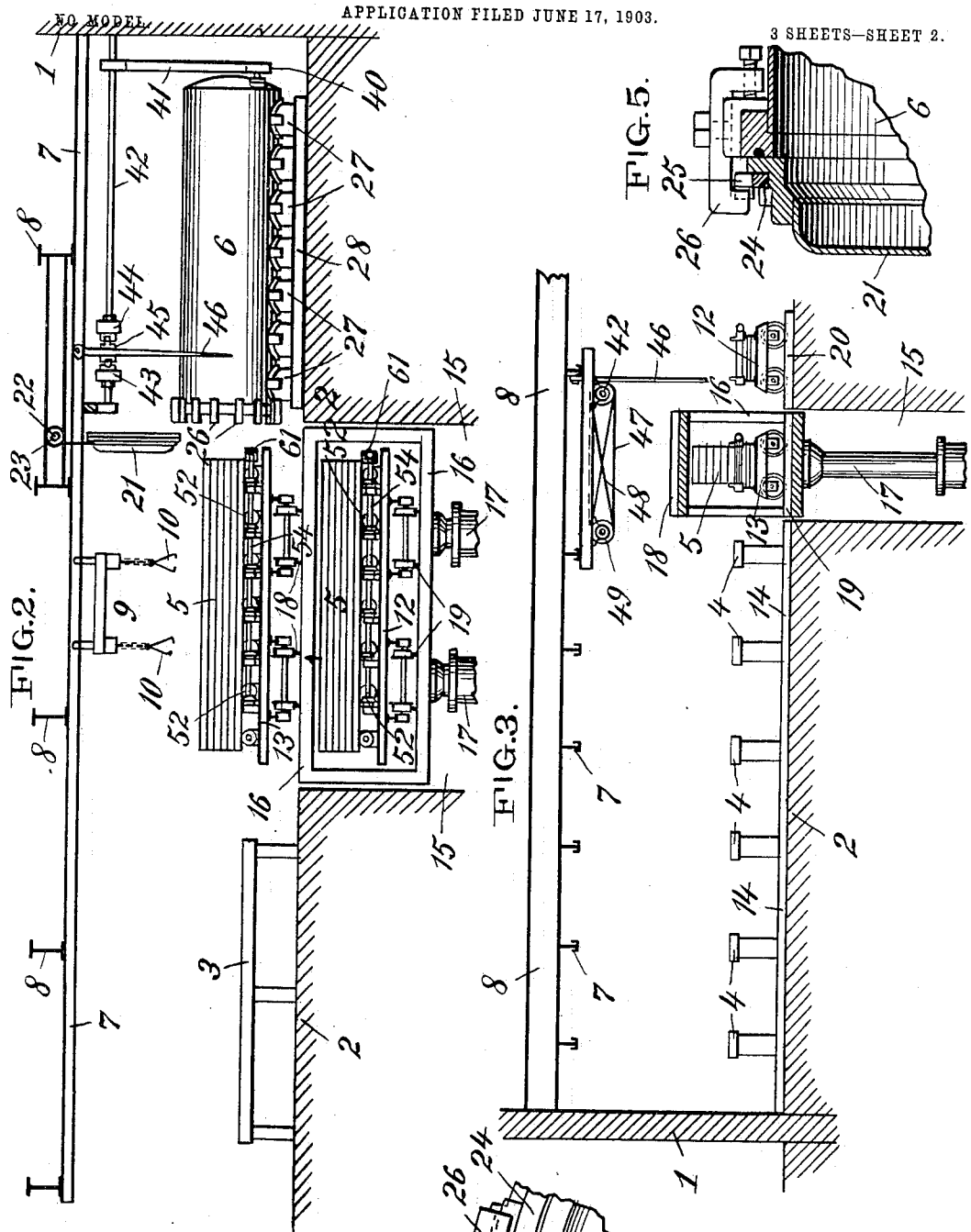
WITNESSES:
Alvin K. Goodwin,
Oliver Williams
INVENTOR
Edwin Copland Shaw
BY
Seward Davis
ATTORNEY

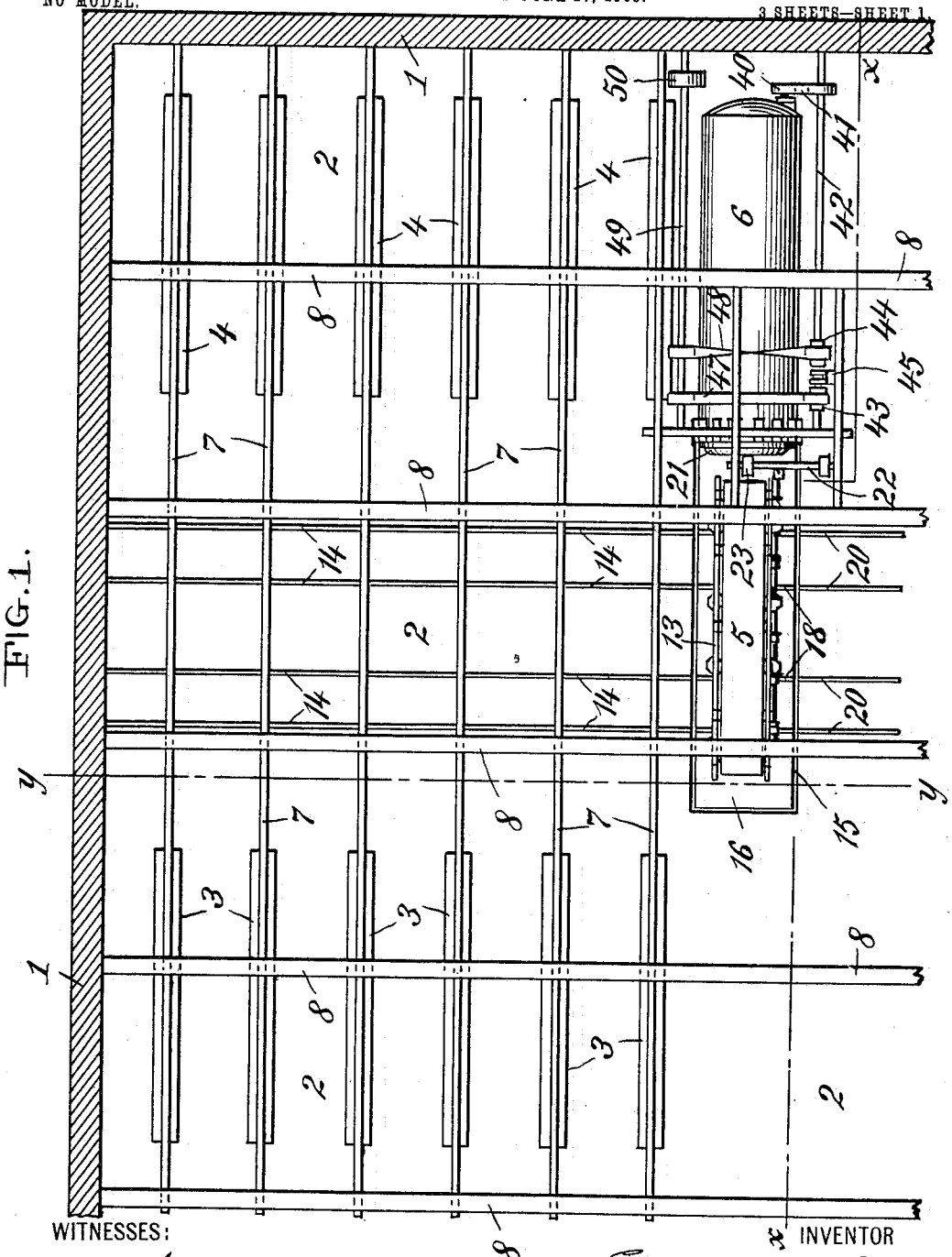

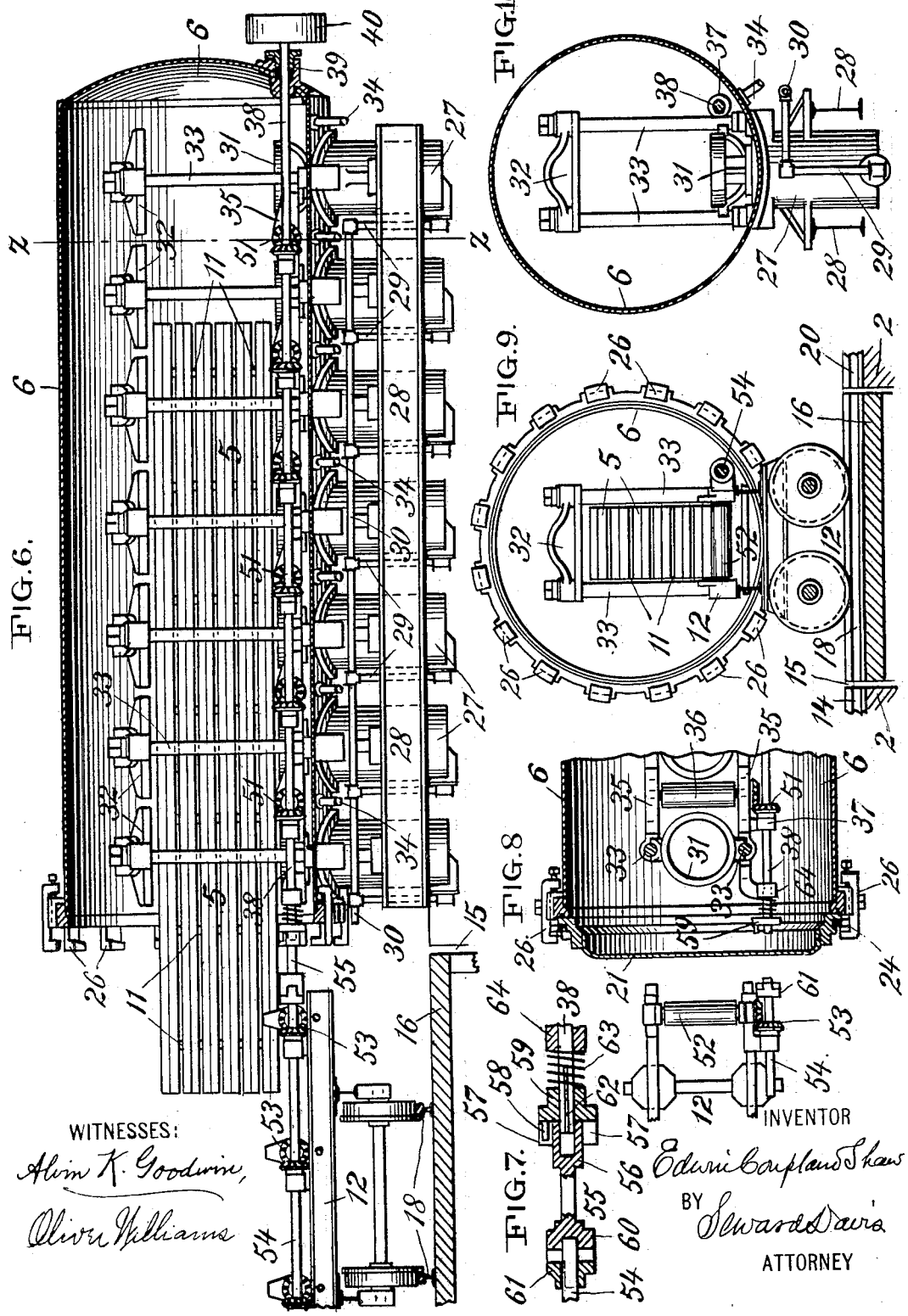

No. 758,864. Patented May 3, 1904.

UNITED STATES PATENT OFFICE.

EDWIN COUPLAND SHAW, OF AKRON, OHIO, ASSIGNOR TO THE B. F. GOODRICH COMPANY OF OHIO, OF AKRON, OHIO, A CORPORATION OF OHIO.

APPARATUS FOR PREPARING, HANDLING, AND VULCANIZING TIRES OR OTHER RUBBER PRODUCTS.

SPECIFICATION forming part of Letters Patent No. 758,864, dated May 3, 1904.

Application filed June 17, 1903. Serial No. 161,887. (No model.)

*To all whom it may concern:*

Be it known that I, EDWIN COUPLAND SHAW, a citizen of the United States of America, residing at the city of Akron, county of Summit, and State of Ohio, have invented certain new and useful Improvements in Apparatus for Preparing, Handling, and Vulcanizing Tires or other Rubber Products, of which the following is a specification.

This invention relates more particularly to apparatus designed for preparing, handling, and vulcanizing vehicle-wheel tires made in straight lengths, usually about fifteen feet long, and vulcanized in heavy metal molds of about the same length. These molds require considerable labor to manipulate them, which involves cleaning them, filling them with green-rubber-tire stock, transferring the filled molds to a heater for vulcanizing the tires therein, then cooling the molds, and finally removing the cured tires from the molds.

The main object of my invention is to provide simple and efficient apparatus operative with marked economy of time, labor, and fuel and assuring quick and easy handling of the heavy tire-molds at all stages of their preparation and permitting nearly-continuous operation of the heater or vulcanizer upon unusually large successive charges of tires in the molds, while improving the quality of the cured-rubber product.

The invention in its most complete embodiment consists in the arrangement for correlated operation of mold-cars, means transferring the molds from preparing-tables to the cars, a vulcanizer, a mold-cooling pit, an elevator working at the pit and upon which the cars loaded with newly-filled molds are run to allow the molds to be charged from the cars into the vulcanizer and onto which cars the hot molds are discharged from the vulcanizer to be at once lowered into the cooling-pit by the elevator, which then is ready to receive a succeeding car-load of newly-filled molds to allow them to be charged from the car into the vulcanizer, the whole cycle of operations permitting discharge of one series of molds from the vulcanizer and the charging of a succeeding series of molds into the vulcanizer without requiring its door to long remain open, thereby preventing excessive loss of heat by radiation from the vulcanizer.

The invention also includes special constructions of the vulcanizer and mold-cars whereby a heavy stack of filled molds may quickly and automatically be run from a car into the vulcanizer and back from the vulcanizer to the car.

The invention also includes various constructions and combinations of parts of the apparatus permitting quick clamping of the molds to hold them closed during vulcanization of their contents and assuring convenience and economy in operation and promoting maximum durability of the entire apparatus, all as hereinafter described and claimed.

Reference is made to the accompanying drawings, forming part of this specification, in which—

Figure 1 is a sectional plan view of portion of a factory-building in which my improved apparatus is set up and with the preferred double-decked elevator lowered and showing a car-load of molds on its upper deck. Fig. 2 is a longitudinal vertical sectional view taken on the line $x$ $x$ in Fig. 1 and shows a car-load of molds on the lower deck of the elevator in the cooling-pit and also shows a second car-load of prepared molds on the upper deck of the elevator ready for charging them into the open vulcanizing-press. Fig. 3 is a detail transverse vertical sectional view taken on the line $y$ $y$ in Fig. 1 and shows the elevator raised and holding on its lower deck a car-load of cooled molds which have just been raised from the cooling-pit and with the empty car which had brought this load of molds to the vulcanizer standing on the extension-rails beyond the elevator. Figs. 4 and 5 are respectively enlarged detail front and sectional side views showing the preferred vulcanizer-door fastenings. Fig. 6 is an enlarged longitudinal vertical sectional view of the vulcanizer-press and portions of one mold-car and the elevator and shows the charge of molds moved by the press and car roller-carriers nearly into the press. Fig. 7 is a detail sectional view of a preferred "grab-coupling" as engaged with the roller-carrier shafts of a mold-car and the vulcanizing-press. Fig. 8 is a detail sectional plan view of the door-closed end of the press and the adjacent end of a mold-car, the grab-coupling being removed. Fig. 9 is a vertical sectional view of the upper deck of the mold-car elevator and an end view of the press and car and shows a charge of molds moving forward from the car into the press as in Fig. 1, and Fig. 10 is a detail transverse vertical sectional elevation taken through the press on the line z z in Fig. 6.

The numeral 1 indicates the walls of a factory-building, on the floor 2 of which are erected, preferably, two opposite series of tables 3 4, each series preferably comprising six tables on which to place the molds 5 for filling them with prepared rubber-tire stock. Each of these molds may receive ten straight vehicle-wheel tires, and the six molds prepared at each series of tables 3 4 are adapted to be charged at once into a vulcanizing-press 6, which has capacity for vulcanizing the unusual number of sixty large tires at each charge. Series of overhead tracks 7 are fastened to cross-beams 8, and on these tracks run traveling hoists 9, each having suitable grapples 10, by which the rubber-filled molds 5 may be lifted from the tables 3 4 and easily stacked with metal cross-bars 11 between them upon either one of two cars 12 13, each adapted to run on four rails 14, laid transversely on the floor 2 between opposing ends of the two series 3 4 of mold-preparing tables.

At a lower level and in front of the vulcanizing-press 6 there is provided in the floor 2 a mold-cooling pit 15, in which a preferably double-decked elevator 16 is arranged to be raised and lowered, preferably, by hydraulic rams 17. The upper and lower decks of this elevator preferably have respective rails 18 19, on which the cars 12 13 may run from the main floor-rails 14. Short extension-rails 20, alined with the main rails 14 and the elevator-rails 18 19, are laid beyond the pit 15 to provide a temporary rest for empty cars run off the elevator after charging their loads of molds into the vulcanizer, as hereinafter more fully explained.

The vulcanizing-press 6 is made with a metal body or shell closed at its back end and having at its front end a door 21, which is preferably made hingeless and is adapted to be removed and replaced by a hoisting apparatus of any approved construction, here represented by a shaft 22, having a drum 23 from a chain on which the door is slung and to which shaft power may be applied in any approved manner. Any other suitable means may be used for quickly removing and replacing the door. I prefer to provide the door 21 with a revoluble latch-ring 24, which has a series of spaced lugs 25, having inclined faces adapted to interlock with inclined or wedging faces on a series of longitudinally-adjustable keepers 26, held to a metal reinforcing-ring on the press-body and permitting locking and unlocking of the door by turning the latch-ring a little in opposite directions to engage and release the wedging faces of the door and press-body lugs and permit the slung door to be quickly and easily opened and tightly closed. Further detailed description of these door locking and unlocking devices is unnecessary, as they form the subject-matter of a companion patent application filed of even date herewith and having Serial No. 161,885.

The vulcanizing-press body is sustained preferably by the cylinders 27 of a series of hydraulic presses, which are in turn supported by side brackets resting on metal beams 28. These cylinders 27 are supplied with water under pressure from a series of pipes 29, leading from a common supply-pipe 30. Water admitted under the hydraulic press-rams forces their skeleton or grating heads 31 upward to clamp the charge of six tire-molds 5 between the ram-heads and the opposing press-heads 32, which are held fixedly by posts 33 to the cylinders 27, the ram-heads 31 being guided on and by these posts. These ram-heads preferably comprise a ring connected by four integral curved brackets with the body of the ram. This skeleton or open-grating construction of the ram-heads 31 allows free circulation through them of steam admitted to the press-body through a series of pipes 34 to effect vulcanization of the rubber tires or products in the clamped series of molds 5. The skeleton construction of the ram-heads and the arrangement of the water and steam pipes are best shown in Figs. 6, 8, and 10 of the drawings. The press-body will have the usual steam-gage and thermometer, which it is not necessary to show or describe.

To and between the upper ends of the hydraulic cylinders 27 at each side there are fixed a series of plates 35, in which are journaled transverse metal rollers 36, arranged in the spaces between the vertically-movable ram-heads 31. The upper peripheries of these rollers normally stand or rotate a little above these heads 31 when the rams are fully lowered. The bearing-plates 35 also longitudinally stay the upper ends of the hydraulic cylinders 27 to each other and further serve to sustain lugs 37 along one side of the vulcanizing-press 6. In these lugs is journaled within the press-body a longitudinal shaft 38, which passes through a stuffing-box 39 at the closed back end of the press-body and carries an outside pulley 40. Power is transmitted to this pulley by a belt 41, running from a pulley on a counter-shaft 42, which has two clutch-pulleys 43 44 and an interposed clutch 45, provided with a shipper 46, adapted to throw the clutch into engagement with either pulley 43 or 44. A straight belt 47 and a crossed belt 48 connect the pulleys 43 44, respectively, with fixed pulleys on a main driving-shaft 49, which may be rotated by a belt running on its pulley 50. By moving the shipper 46 to engage the clutch 45 with the pulleys 43 44 the counter-shaft 42, and consequently the press-shaft 38, may be caused to rotate in opposite directions, and as the shaft 38 is geared to each of the press-rollers 36 by bevel-gearing 51 these rollers also will have imparted to them rotations in opposite directions, as may be required for carrying the charge of molds 5 into or out of the vulcanizer, the series of rollers constituting an easy-working roller-carrier for the heavy stack of molds.

Each of the two cars 12 13 is provided with a series of transverse mold-carrying rollers 52, which are connected revolubly by bevel-gearing 53 with a longitudinal shaft 54, journaled on the car body or frame. When the vulcanizing-press door 21 is opened or removed, the car-shaft 54 is adapted to be connected to the press-shaft 38 by a grab-coupling 55 to cause both shafts to rotate together, and thereby compel the stack of molds 5 to move along on the rollers from the car to the press-body or from the press-body to the car, both series of rollers 52 and 36 coöperating in this roller transfer of the molds in both directions.

The grab-coupling 55 preferably comprises a short hand-bar having one bored clutch-head 56, carrying two diametrically opposite radial ribs 57, with either of which a pin 58 of a sliding clutch member 59 on the press-shaft 38 may engage, and the opposite notched clutch-head 60 of the coupling is adapted to engage a correspondingly-notched clutch member 61 on the car-shaft 54. The clutch member 59 is splined to fit a feather 62 on the shaft 38 and is normally forced outward by a spring 63, placed between it and a bearing 64 of said shaft. In applying the coupling 55 its clutch-head 56 will be pressed against the clutch member 59 to force it inward on the shaft 38 against the expanding tendency of the spring 63, and the other notched coupling-head 60 will then be engaged with the car-shaft clutch 61 as the spring 63 is permitted to expand and force the grab-coupling outward to connect both shafts 38 54 together. This grab-coupling is best shown in Figs. 6, 7, and 8 of the drawings.

The operation of the complete apparatus may be summarized as follows: Let it be supposed that the car 12 is standing on the main rails 14 between the two series of tables 3 4 and that six molds filled with sixty tires at the tables 3 had been transferred therefrom by the traveling hoists 9 10 to the car and had been stacked thereon with spacing-bars 11 between them. The elevator 16 being down, this car 12 is run along the rails 14 onto the upper-deck rails 18 of the elevator, and the vulcanizer-door 21 is opened and the grab-coupling 55 is applied to connect the car-shaft 54 with the vulcanizer-shaft 38. The shipper 46 now is operated to throw in gear the proper driving-pulley—say the one 43—which causes rotation of the shafts 38 54 in direction to turn the car-rollers 52 and the press-rollers 36 forward for moving the load of six molds 5 from the car 12 into the vulcanizing-press 6, as will be understood from Figs. 6 and 9 of the drawings. When the molds are rolled forward fully within the vulcanizer, the rotation of shafts 38 54 is stopped by uncoupling the shipper-clutch 45. The grab-coupling 55 is now removed and the hydraulic press-rams are then raised by water-pressure at the pipes 30 29 and will lift the stack of six molds from the press-rollers 36 and clamp them evenly between the ram-heads 31 and the fixed heads 32 to hold the molds securely closed. The door 21 may be lowered and applied to close the vulcanizer either before or after the molds have been clamped by the hydraulic rams. After the door is securely locked by turning its latch-ring 24 steam is admitted to the press through the pipes 34 to effect vulcanization of the tires in the molds 5. Separating the molds by the spacing-bars 11 assures free circulation of steam around all parts of the molds to vulcanize their rubber contents uniformly and quickly. When vulcanization is completed, steam is shut off and the door 21 is unlocked by reversely turning its latch-ring 24, thus leaving the door free to fall away from the end of the vulcanizer 6 while suspended from the sling-hoist 22 23, which then will be operated to again lift the door clear of the press, as shown in Fig. 2 of the drawings. It will be understood that after the load of molds 5 had been charged into the vulcanizer from the car 12 said car had been run off the upper-deck elevator-rails 18 upon the extension-rails 20. While the above-named load of molds lately charged into the vulcanizer from the car 12 is being subjected to vulcanizing heat, the preceding six molds which had been discharged hot from the vulcanizer upon the other car 13 while it stood upon the lower-deck rails 19 of the elevator are submerged in water in the cooling-pit 15. After the empty car 12 has been moved over onto the rails 20 and when the submerged molds on said car 13 have been cooled in the pit 15 the elevator is raised by the hydraulic rams 17 to carry said car on the lower deck of the elevator to the level of the main rails 14, these being the relative positions of the two cars 12 13. (Shown in Fig. 3 of the drawings.) This carload 13 of cooled molds is now run from the elevator upon the main rails 14 between the two series of tables 3 4 to allow the molds to be taken from it by the traveling hoists 9 10 and deposited thereby upon the tables 3, from which the last charge of molds had been taken to load the other car 12 and on which tables the cooled molds will be cleaned and refilled with rubber-tire stock. After the car 13, loaded with cooled molds, had been lifted from the pit 15 and run over onto the rails 14, as above described, the empty car 12 is returned from the side rails 20 onto the lower-deck elevator-rails 19, from which the car 13 had just moved, and said car 12 now is ready to receive from the vulcanizer the last charge of molds 5 it lately delivered to it after vulcanization of the tires in these molds is effected and steam is shut off from the pipes 34. To permit this mold discharge, the vulcanizer-door 21 is unlocked and then lifted by the hoist 22 23, and the water-pressure at pipes 30 29 is at the same time relieved to allow the ram-heads 31 to fall, and thus unclamp the molds 5 and let them again rest upon the vulcanizer-rollers 36. The coupling 55 now is applied to again connect the vulcanizer and car-shafts 38 54, and the shipper 46 is moved to engage the clutch 45 with the other clutch-pulley 44, which will cause the vulcanizer and car-rollers 38 54 to rotate backward to carry the load of hot molds 5 from the rollers 36 of the vulcanizer and upon the rollers 52 of the car 12. By this time the other car, 13, has been loaded with molds 5, which had been filled or prepared at the other series of tables 4 and stands on the rails 14 next the raised elevator, which after the coupling 55 has been removed from the shaft 54 of car 12 is quickly lowered to carry the car-load 12 of hot molds down into the cooling-pit 15, and the car 13, with its load of newly-filled molds, is then at once run upon the upper-deck rails 18 of the elevator, these being the relative positions of the two loaded cars shown in Fig. 2 of the drawings. The coupling 55 now is quickly applied to connect the vulcanizer-shaft 38 with the shaft 54 of the car 13, and the shipper 46 is again moved to engage clutches 45 43 to cause forward rotation of the car and vulcanizer-rollers 52 36 to move the load of molds forward from the car 13 into the vulcanizer 6 ready for clamping the molds 5 by the hydraulic rams 31 and for closing the door 21 to permit vulcanization of the rubber tires in these molds. The empty car 13 now is run off the elevator upon the extension-rails 20, and when the molds on the now submerged car 12 are cooled the elevator will again be raised to carry this car to the rails 14, upon which it is run to permit unloading of the cooled molds upon the series of tables 4, from which the other car 13 had received its last load of molds, which are now in the vulcanizer, and so on in successive cycles of operations, the two cars being successively loaded and the contents of their respective molds successively vulcanized and the two cars being successively lowered into the pit 15 for cooling their loads of hot molds and successively raised and run off upon the rails 14 to allow the cooled molds to be transferred by the traveling hoists 9 10 to the respective series of tables 3 4 to be thereon cleaned and refilled with green tires or other rubber goods in readiness for vulcanization. In the preferred method or sequence of operations the hot molds always are discharged from the vulcanizer onto cars standing on the lower deck of the elevator, and the molds always are charged into the vulcanizer from cars standing on the upper deck of the elevator.

It is obvious that only a few minutes need elapse between the opening of the vulcanizer-door to permit discharge of one series of hot molds onto one car and the closing of the door after charging another series of freshly-filled molds into the vulcanizer from the other car. There consequently is very little waste of heat, as the vulcanizer cools but slightly during the brief time its door is open. The vulcanizing of successive charges of tires in the molds thus is made nearly continuous, whereby a great saving of time, labor, and fuel is effected as compared with the operation of other apparatus of this general character.

It is not new to subject dental flasks or molds to constant spring-pressure to hold them closed during vulcanization of their rubber contents by heat circulating around the molds placed in a heating-chamber; but this prior method is best adapted for vulcanizing rubber goods having small bulk, mass, or area and is not well adapted for economically and satisfactorily vulcanizing bulky or massive rubber stock, such as vehicle-wheel tires made either in straight lengths, as herein shown, or in the annular form shown in other applications for patents filed by me of even date herewith, Serial Nos. 161,886 and 161,888. Such massive rubber stock has heretofore been vulcanized in molds the parts of which are clamped together all around the margin by numerous bolts tightened only by considerable time-consuming, arduous, and expensive labor prior to placing the molds in a steam or heating chamber for effecting vulcanization by the aid of steam or heat circulating directly around the molds in said chamber. Notwithstanding the care necessarily taken in thus tightening the molds by marginally-disposed bolts the internal pressures arising while curing massive rubber stock in such bolt-locked molds are at times sufficient to buckle or burst the heaviest molds, particularly at their central areas, which are distant more or less from the marginal clamping-bolts. It is common also to place molds containing massive rubber stock, such as vehicle-wheel tires, between closed steam-chambers and to compress said chambers and the intervening molds by hydraulic pressure; but this method of curing is not certain to assure uniform vulcanization of all parts of the rubber stock, because the heat is greater at the top and bottom of the molds than at their edges, which are exposed to the atmosphere. By my apparatus and method a stack of molds separated by cross-bars are placed within a heating or steam chamber, and free circulation of uniform vulcanizing heat is assured at and around practically all parts of the molds, while they are clamped for substantially their whole area by heavy pressure compensating for change in mass of the rubber products in the molds under influence of the applied heat. I am thus able always to obtain a perfectly and uniformly vulcanized rubber product without warping or bursting of even the largest molds and in very much less time and with far less labor than usually is required. After the proper pressure per square inch required for any given size or composition of tires or other rubber goods in the molds is calculated and the valve admitting water to the rams is set to obtain such pressure on the molds the rams automatically adjust themselves to compensate change in mass of the rubber contents of the molds during the entire vulcanization process and without readjusting the valve or any other part of the apparatus.

The drawings represent apparatus including the most complete and preferred embodiment of my invention; but I state that the use of rails for the mold cars or carriages is not essential, nor is it necessary that the elevator at the cooling-pit have two decks, and one or more mold cars or carriages may be used without departing from the spirit of my invention. The invention may also be otherwise modified by the skilled mechanic within the scope of the appended claims.

I have made a separate patent application, which is a division of this one and has Serial No. 177,925, filed October 21, 1903, and more particularly describes and claims the special novel features of the horizontal vulcanizer, including the means for charging it with prepared molds from the mold-cars and for discharging the hot molds from it upon the cars, and as dissociated from the mold-tables, the traveling hoists, the cooling-pit, and the elevator with which the vulcanizer and the means for charging and discharging it and for compressing the molds are legitimately combined or correlated in the complete apparatus herein described and claimed.

I claim as my invention—

1. Apparatus of the character described, comprising one or more mold-cars, a vulcanizer, a mold-cooling pit, and an elevator adapted to lower the mold-loaded cars into the pit and to raise them therefrom.

2. Apparatus of the character described, comprising one or more mold-cars, a vulcanizer, a mold-cooling pit, an elevator having rails for the mold-cars and adapted to lower the mold-loaded cars into the pit and to raise them therefrom, and rails upon which the mold-cars run to transfer the molds to and from the elevator and vulcanizer.

3. Apparatus of the character described, comprising mold-preparing tables, tracks above the tables, one or more mold-cars, traveling hoists on said overhead tracks adapted to transfer the molds from the tables to the cars and back to the tables, a vulcanizer, a mold-cooling pit, and an elevator adapted to lower the mold-loaded cars into the pit and to raise them therefrom.

4. Apparatus of the character described, comprising mold-preparing tables, tracks above the tables, one or more mold-cars, traveling hoists on said overhead tracks adapted to transfer the molds from the tables to the cars and back to the tables, a vulcanizer, a mold-cooling pit, an elevator adapted to lower the mold-loaded cars into the pit and to raise them therefrom, and rails for the cars extending from the mold-tables to and upon the elevator.

5. Apparatus of the character described, comprising one or more mold-cars, a vulcanizer, a mold-cooling pit disposed at a lower level directly in front of the vulcanizer, and an elevator adapted to lower the mold-loaded cars into the pit and to raise them therefrom.

6. Apparatus of the character described, comprising one or more mold-cars, a vulcanizer, a mold-cooling pit disposed at a lower level directly in front of the vulcanizer, an elevator adapted to lower the mold-loaded cars into the pit and to raise them therefrom, and rails upon which the mold-cars run to transfer the molds to and from the elevator and vulcanizer.

7. Apparatus of the character described, comprising mold-preparing tables, tracks above the tables, one or more mold-cars, traveling hoists on said tracks adapted to transfer the molds from the tables to the cars and back to the tables, a vulcanizer, a mold-cooling pit disposed at a lower level directly in front of the vulcanizer, and an elevator adapted to lower the mold-loaded cars into the pit and to raise them therefrom.

8. Apparatus of the character described, comprising mold-preparing tables, tracks above the tables, one or more mold-cars, traveling hoists on said overhead tracks adapted to transfer the molds from the tables to the cars and back to the tables, a vulcanizer, a mold-cooling pit disposed at a lower level directly in front of the vulcanizer, an elevator adapted to lower the mold-loaded cars into the pit and to raise them therefrom, and rails for the cars extending from the mold-tables to and upon the elevator.

9. Apparatus of the character described, comprising mold-cars, a vulcanizer, a mold-cooling pit, and a double-decked elevator adapted to receive on its lower deck the cars and the molds discharged upon them from the vulcanizer and to lower said cars with their loads of hot molds into the cooling-pit, said elevator also adapted to receive on its upper deck car-loads of newly-prepared molds ready for charging these molds from the cars into the vulcanizer.

10. Apparatus of the character described, comprising mold-cars, a vulcanizer, a mold-cooling pit, and a double-decked elevator having rails on both decks for the cars and adapted to support on its lower-deck rails the cars and the molds discharged on them from the vulcanizer and to lower said cars with their loads of hot molds into the cooling-pit, said elevator also adapted to support on its upper-deck rails car-loads of newly-prepared molds ready for charging these molds from the cars into the vulcanizer, and rails upon which the mold-cars run to transfer the molds to and from the elevator and vulcanizer.

11. Apparatus of the character described, comprising mold-preparing tables, tracks above the tables, mold-cars, traveling hoists on said overhead tracks adapted to transfer the molds from the tables to the cars and back to the tables, a vulcanizer, a mold-cooling pit, and a double-decked elevator adapted to receive on its lower deck the cars and the molds discharged on them from the vulcanizer and to lower said cars with their loads of hot molds into the cooling-pit, said elevator also adapted to receive on its upper deck the cars and the newly-prepared molds loaded on them by the traveling hoists ready for charging these molds from the cars into the vulcanizer.

12. Apparatus of the character described, comprising mold-preparing tables, tracks above the tables, mold-cars, traveling hoists on said overhead tracks adapted to transfer the molds from the tables to the cars and back to the tables, a vulcanizer, a mold-cooling pit, and a double-decked elevator having rails on both decks for the cars and adapted to support on its lower-deck rails the cars and the molds discharged on them from the vulcanizer and to lower said cars with their loads of hot molds into the cooling-pit, said elevator also adapted to support on its upper-deck rails the cars and the newly-prepared molds loaded on them by the traveling hoists ready for charging these molds from the cars into the vulcanizer, and rails for the cars extending from the mold-tables to the elevator.

13. Apparatus of the character described, comprising mold-cars, a vulcanizer having interior means adapted to automatically transfer molds into and out of it from and to the cars, a mold-cooling pit, and an elevator adapted to lower the mold-loaded cars into the pit and to raise them therefrom.

14. Apparatus of the character described, comprising mold-cars having means adapted to automatically propel their loads of molds, a vulcanizer having interior means adapted to automatically transfer molds into and out of it from and to the cars, a mold-cooling pit, and an elevator adapted to lower the mold-loaded cars into the pit and to raise them therefrom.

15. Apparatus of the character described, comprising mold-cars having means adapted to automatically propel their loads of molds, a vulcanizer having interior means adapted to automatically transfer molds into and out of it from and to the cars, means adapted to couple for simultaneous operation the car-load-propelling means and the vulcanizer-mold-transferring means, a mold-cooling pit, and an elevator adapted to lower the mold-loaded cars into the pit and to raise them therefrom.

16. Apparatus of the character described, comprising mold-preparing tables, tracks above the tables, mold-cars, traveling hoists on said overhead tracks adapted to transfer the molds from the tables to the cars and back to the tables, a vulcanizer having interior means adapted to automatically transfer molds into and out of it from and to the cars, a mold-cooling pit, and an elevator adapted to lower the mold-loaded cars into the pit and to raise them therefrom.

17. Apparatus of the character described, comprising mold-preparing tables, tracks above the tables, mold-cars having means adapted to automatically propel their loads of molds, traveling hoists on said overhead tracks adapted to transfer the molds from the tables to the cars and back to the tables, a vulcanizer having interior means adapted to automatically transfer molds into and out of it from and to the cars, a mold-cooling pit, and an elevator adapted to lower the mold-loaded cars into the pit and to raise them therefrom.

18. Apparatus of the character described, comprising mold-preparing tables, tracks above the tables, mold-cars having means adapted to automatically propel their loads of molds, traveling hoists on said overhead tracks adapted to transfer the molds from the tables to the cars and back to the tables, a vulcanizer having interior means adapted to automatically transfer molds into and out of it from and to the cars, means adapted to couple for simultaneous operation the car-load-propelling means and the vulcanizer-mold-transferring means, a mold-cooling pit, and an elevator adapted to lower the mold-loaded cars into the pit and to raise them therefrom.

19. Apparatus of the character described, comprising mold-cars, a vulcanizer having interior means adapted to automatically transfer molds into and out of it from and to the cars, a mold-cooling pit, an elevator adapted to lower the mold-loaded cars into the pit and to raise them therefrom, and rails upon which the mold-cars run to transfer the molds to and from the elevator and vulcanizer.

20. Apparatus of the character described, comprising mold-cars having means adapted to automatically propel their loads of molds, a vulcanizer having interior means adapted to automatically transfer molds into and out of it from and to the cars, a mold-cooling pit, an elevator adapted to lower the mold-loaded cars into the pit and to raise them therefrom, and rails upon which the mold-cars run to transfer the molds to and from the elevator and vulcanizer.

21. Apparatus of the character described, comprising mold-cars having means adapted to automatically propel their loads of molds, a vulcanizer having interior means adapted to automatically transfer molds into and out of it from and to the cars, means adapted to couple for simultaneous operation the car-load-propelling means and the vulcanizer-mold-transferring means, a mold-cooling pit, an elevator adapted to lower the mold-loaded cars into the pit and to raise them therefrom, and rails upon which the mold-cars run to transfer the molds to and from the elevator and vulcanizer.

22. Apparatus of the character described, comprising mold-preparing tables, tracks above the tables, mold-cars, traveling hoists on said overhead tracks adapted to transfer the molds from the tables to the cars and back to the tables, a vulcanizer having interior means adapted to automatically transfer molds into and out of it from and to the cars, a mold-cooling pit, an elevator adapted to lower the mold-loaded cars into the pit and to raise them therefrom, and rails upon which the mold-cars run to transfer the molds to and from the tables, the elevator and the vulcanizer.

23. Apparatus of the character described, comprising mold-preparing tables, tracks above the tables, mold-cars having means adapted to automatically propel their loads of molds, traveling hoists on said overhead tracks adapted to transfer the molds from the tables to the cars and back to the tables, a vulcanizer having interior means adapted to automatically transfer molds into and out of it from and to the cars, a mold-cooling pit, an elevator adapted to lower the mold-loaded cars into the pit and to raise them therefrom, and rails upon which the mold-cars run to transfer the molds to and from the tables, the elevator and the vulcanizer.

24. Apparatus of the character described, comprising mold-preparing tables, tracks above the tables, mold-cars having means adapted to automatically propel their loads of molds, traveling hoists on said overhead tracks adapted to transfer the molds from the tables to the cars and back to the tables, a vulcanizer having interior means adapted to automatically transfer molds into and out of it from and to the cars, means adapted to couple for simultaneous operation the car-load-propelling means and the vulcanizer-mold-transferring means, a mold-cooling pit, an elevator adapted to lower the mold-loaded cars into the pit and to raise them therefrom, and rails upon which the mold-cars run to transfer the molds to and from the tables, the elevator and the vulcanizer.

25. Apparatus of the character described, comprising mold-cars, a vulcanizer having interior means adapted to automatically transfer molds into and out of it from and to the cars, a mold-cooling pit, and a double-decked elevator adapted to support on its lower deck the cars and the molds discharged upon them from the vulcanizer and to lower said cars with their loads of hot molds into the cooling-pit, said elevator being also adapted to receive on its upper deck car-loads of newly-prepared molds ready for charging these molds from the cars into the vulcanizer.

26. Apparatus of the character described, comprising mold-cars having means adapted to automatically propel their loads of molds, a vulcanizer having interior means adapted to automatically transfer molds into and out of it from and to the cars, a mold-cooling pit, and a double-decked elevator adapted to support on its lower deck the cars and the molds discharged upon them from the vulcanizer and to lower said cars with their loads of hot molds into the cooling-pit, said elevator being also adapted to receive on its upper deck car-loads of newly-prepared molds ready for charging these molds from the cars into the vulcanizer.

27. Apparatus of the character described, comprising mold-cars having means adapted to automatically propel their loads of molds, a vulcanizer having interior means adapted to automatically transfer molds into and out of it from and to the cars, means adapted to couple for simultaneous operation the car-load-propelling means and the vulcanizer-mold-transferring means, a mold-cooling pit, and a double-decked elevator adapted to support on its lower deck the cars and the molds discharged upon them from the vulcanizer and to lower said cars with their loads of hot molds into the cooling-pit, said elevator being also adapted to receive on its upper deck car-loads of newly-prepared molds ready for charging these molds from the cars into the vulcanizer.

28. Apparatus of the character described, comprising mold-preparing tables, tracks above the tables, mold-cars, traveling hoists on said overhead tracks adapted to transfer the molds from the tables to the cars and back to the tables, a vulcanizer having interior means adapted to automatically transfer molds into and out of it from and to the cars, a mold-cooling pit, and a double-decked elevator adapted to support on its lower deck the cars and the molds discharged on them from the vulcanizer and to lower said cars with their loads of hot molds into the cooling-pit, said elevator being also adapted to support on its upper deck car-loads of newly-prepared molds ready for charging these molds from the cars into the vulcanizer.

29. Apparatus of the character described, comprising mold-preparing tables, tracks above the tables, mold-cars having means adapted to automatically propel their loads of molds, traveling hoists on said overhead tracks adapted to transfer the molds from the tables to the cars and back to the tables, a vulcanizer having interior means adapted to automatically transfer molds into and out of it from and to the cars, a mold-cooling pit, and a double-decked elevator adapted to support on its lower deck the cars and the molds discharged on them from the vulcanizer and to lower said cars with their loads of hot molds into the cooling-pit, said elevator being also adapted to support on its upper deck car-loads of newly-prepared molds ready for charging these molds from the cars into the vulcanizer.

30. Apparatus of the character described, comprising mold-preparing tables, tracks above the tables, mold-cars having means adapted to automatically propel their loads of molds, traveling hoists on said overhead tracks adapted to transfer the molds from the tables to the cars and back to the tables, a vulcanizer having interior means adapted to automatically transfer molds into and out of it from and to the cars, means adapted to couple for simultaneous operation the car-load-propelling means and the vulcanizer-mold-transferring means, a mold-cooling pit, and a double-decked elevator adapted to support on its lower deck the cars and the molds discharged on them from the vulcanizer and to lower said cars with their loads of hot molds into the cooling-pit, said elevator being also adapted to support on its upper deck car-loads of newly-prepared molds ready for charging these molds from the cars into the vulcanizer.

31. Apparatus of the character described, comprising mold-cars, a vulcanizer having interior means adapted to compress molds charged into it from the cars, a mold-cooling pit, and an elevator adapted to lower the mold-loaded cars into the pit and to raise them therefrom.

32. Apparatus of the character described, comprising mold-cars, a vulcanizer having interior means adapted to automatically transfer molds into and out of it from and to the cars and also having interior means adapted to compress molds charged into it from the cars, a mold-cooling pit, and an elevator adapted to lower the mold-loaded cars into the pit and to raise them therefrom.

33. Apparatus of the character described, comprising mold-cars having means adapted to automatically propel their loads of molds, a vulcanizer having interior means adapted to compress molds charged into it from the cars, a mold-cooling pit, and an elevator adapted to lower the mold-loaded cars into the pit and to raise them therefrom.

34. Apparatus of the character described, comprising mold-cars having means adapted to automatically propel their loads of molds, a vulcanizer having interior means adapted to automatically transfer molds into and out of it from and to the cars and also having interior means adapted to compress molds charged into it from the cars, a mold-cooling pit, and an elevator adapted to lower the mold-loaded cars into the pit and to raise them therefrom.

35. Apparatus of the character described, comprising mold-cars having means adapted to automatically propel their loads of molds, a vulcanizer having interior means adapted to automatically transfer molds into and out of it from and to the cars and also having interior means adapted to compress molds charged into it from the cars, means adapted to couple for simultaneous operation the car-load-propelling means and the vulcanizer-mold-transferring means, a mold-cooling pit, and an elevator adapted to lower the mold-loaded cars into the pit and to raise them therefrom.

36. Apparatus of the character described, comprising mold-preparing tables, tracks above the tables, mold-cars, traveling hoists on said overhead tracks adapted to transfer the molds from the tables to the cars, a vulcanizer having interior means adapted to compress molds charged into it from the cars, a mold-cooling pit, and an elevator adapted to lower the mold-loaded cars into the pit and to raise them therefrom to permit return of the cooled molds from the cars to the tables by the traveling hoists.

37. Apparatus of the character described, comprising mold-preparing tables, tracks above the tables, mold-cars, traveling hoists on said overhead tracks adapted to transfer the molds from the tables to the cars, a vulcanizer having interior means adapted to automatically transfer molds into and out of it from and to the cars and also having interior means adapted to compress molds charged into it from the cars, a mold-cooling pit, and an elevator adapted to lower the mold-loaded cars into the pit and to raise them therefrom to permit return of the cooled molds from the cars to the tables by the traveling hoists.

38. Apparatus of the character described, comprising mold-preparing tables, tracks above the tables, mold-cars having means adapted to automatically propel their loads of molds, traveling hoists on said overhead tracks adapted to transfer the molds from the tables to the cars, a vulcanizer having interior means adapted to compress molds charged into it from the cars, a mold-cooling pit, and an elevator adapted to lower the mold-loaded cars into the pit and to raise them therefrom to permit return of the cooled molds from the cars to the tables by the traveling hoists.

39. Apparatus of the character described, comprising mold-preparing tables, tracks above the tables, mold-cars having means adapted to automatically propel their loads of molds, traveling hoists on said overhead tracks adapted to transfer the molds from the tables to the cars, a vulcanizer having interior means adapted to automatically transfer molds into and out of it from and to the cars and also having interior means adapted to compress molds charged into it from the cars, a mold-cooling pit, and an elevator adapted to lower the mold-loaded cars into the pit and to raise them therefrom to permit return of the cooled molds from the cars to the tables by the traveling hoists.

40. Apparatus of the character described, comprising mold-preparing tables, tracks above the tables, mold-cars having means adapted to automatically propel their loads of molds, traveling hoists on said overhead tracks adapted to transfer the molds from the tables to the cars, a vulcanizer having interior means adapted to automatically transfer molds into and out of it from and to the cars and also having interior means adapted to compress molds charged into it from the cars, means adapted to couple for simultaneous operation the car-load-propelling means and the vulcanizer-mold-transferring means, a mold-cooling pit, and an elevator adapted to lower the mold-loaded cars into the pit and to raise them therefrom to permit return of the cooled molds from the cars to the tables by the traveling hoists.

41. Apparatus of the character described, comprising mold-cars, a vulcanizer having interior means adapted to compress molds charged into it from the cars, a mold-cooling pit, and a double-decked elevator adapted to support on its lower deck the cars and the molds discharged on them from the vulcanizer and to lower said cars with their loads of hot molds into the cooling-pit, said elevator also adapted to receive on its upper deck car-loads of newly-prepared molds ready for charging these molds from the cars into the vulcanizer.

42. Apparatus of the character described, comprising mold-cars having means adapted to automatically propel their loads of molds, a vulcanizer having interior means adapted to automatically transfer molds into and out of it from and to the cars and also having interior means adapted to compress molds charged into it from the cars, a mold-cooling pit, and a double-decked elevator adapted to support on its lower deck the cars and the molds discharged on them from the vulcanizer and to lower said cars with their loads of hot molds into the cooling-pit, said elevator also adapted to receive on its upper deck car-loads of newly-prepared molds ready for charging these molds from the cars into the vulcanizer.

43. Apparatus of the character described, comprising mold-cars having means adapted to automatically propel their loads of molds, a vulcanizer having interior means adapted to automatically transfer molds into and out of it from and to the cars and also having interior means adapted to compress molds charged into it from the cars, means adapted to couple for simultaneous operation the car-load-propelling means and the vulcanizer-mold-transferring means, a mold-cooling pit, and a double-decked elevator adapted to support on its lower deck the cars and the molds discharged on them from the vulcanizer and to lower said cars with their loads of hot molds into the cooling-pit, said elevator being also adapted to receive on its upper deck car-loads of newly-prepared molds ready for charging these molds from the cars into the vulcanizer.

44. Apparatus of the character described, comprising mold-preparing tables, tracks above the tables, mold-cars, traveling hoists on said overhead tracks adapted to transfer the molds from the tables to the cars and back to the tables, a vulcanizer having interior means adapted to automatically transfer molds into and out of it from and to the cars and also having interior means adapted to compress molds charged into it from the cars, a mold-cooling pit, and a double-decked elevator adapted to support on its lower deck the cars and the molds discharged on them from the vulcanizer and to lower said cars with their loads of hot molds into the cooling-pit, said elevator being also adapted to receive on its upper deck car-loads of newly-prepared molds ready for charging these molds from the cars into the vulcanizer.

45. Apparatus of the character described, comprising mold-preparing tables, tracks above the tables, mold-cars having means adapted to automatically propel their loads of molds, traveling hoists on said overhead tracks adapted to transfer the molds from the tables to the cars and back to the tables, a vulcanizer having interior means adapted to automatically transfer molds into and out of it from and to the cars and also having interior means adapted to compress molds charged into it from the cars, a mold-cooling pit, and a double-decked elevator adapted to support on its lower deck the cars and the molds discharged on them from the vulcanizer and to lower said cars with their loads of hot molds into the cooling-pit, said elevator being also adapted to receive on its upper deck car-loads of newly-prepared molds ready for charging these molds from the cars into the vulcanizer.

46. Apparatus of the character described, comprising mold-preparing tables, tracks above the tables, mold-cars having means adapted to automatically propel their loads of molds, traveling hoists on said overhead tracks adapted to transfer the molds from the tables to the cars and back to the tables, a vulcanizer having interior means adapted to automatically transfer molds into and out of it from and to the cars and also having interior means adapted to compress molds charged into it from the cars, means adapted to couple for simultaneous operation the car-load-propelling means and the vulcanizer-mold-transferring means, a mold-cooling pit, and a double-decked elevator adapted to support on its lower deck the cars and the molds discharged on them from the vulcanizer and to lower said cars with their loads of hot molds into the cooling-pit, said elevator being also adapted to receive on its upper deck car-loads of newly-prepared molds ready for charging these molds from the cars into the vulcanizer.

47. Apparatus of the character described, comprising mold-cars, a horizontal vulcanizer having interior rollers 36, a shaft 38, and gearing 51 adapted to rotate the rollers simultaneously in opposite directions to transfer molds from the cars to the vulcanizer and back to the cars, a mold-cooling pit, and an elevator adapted to lower the mold-loaded cars into the pit and to raise them therefrom.

48. Apparatus of the character described, comprising mold-cars having rollers 52, a shaft 54, and gearing 53 adapted to rotate the rollers 52 simultaneously in opposite direction to propel the car-loads of molds correspondingly, a horizontal vulcanizer having interior rollers 36, a shaft 38, and gearing 51 adapted to rotate the rollers 36 simultaneously in opposite directions to transfer molds from the cars to the vulcanizer and back to the cars, detachable devices adapted to couple for simultaneous operation the shafts 38, 54 of the vulcanizer and cars, a mold-cooling pit, and an elevator adapted to lower the mold-loaded cars into the pit and to raise them therefrom.

49. Apparatus of the character described, comprising mold-preparing tables, tracks 7 above the tables, mold-cars, traveling hoists running on the tracks 7 and adapted to load the molds from the tables to the cars and return the molds from the cars to the tables, a horizontal vulcanizer having interior rollers 36, a shaft 38, and gearing 51 adapted to rotate the rollers 36 simultaneously in opposite directions to transfer molds from the cars to the vulcanizer and back to the cars, a mold-cooling pit, and an elevator adapted to lower the mold-loaded cars into the pit and to raise them therefrom.

50. Apparatus of the character described, comprising mold-preparing tables, tracks 7 above the tables, mold-cars having rollers 52, a shaft 54, and gearing 53 adapted to rotate the rollers 52 simultaneously in opposite directions to propel the car-loads of molds correspondingly, traveling hoists running on the tracks 7 and adapted to load the molds from the tables to the cars and return the molds from the cars to the tables, a horizontal vulcanizer having interior rollers 36, a shaft 38, and gearing 51 adapted to rotate the rollers 36 simultaneously in opposite directions to transfer molds from the cars to the vulcanizer and back to the cars, detachable devices adapted to couple for simultaneous operation the shafts 38, 54 of the vulcanizer and cars, a mold-cooling pit, and an elevator adapted to lower the mold-loaded cars into the pit and to raise them therefrom.

51. Apparatus of the character described, comprising mold-cars, a horizontal vulcanizer having interior rollers 36, a shaft 38, and gearing 51 adapted to rotate the rollers simultaneously in opposite directions to transfer molds from the cars to the vulcanizer and back to the cars, said vulcanizer also having rams 31 and opposing heads 32 between which the molds are compressed, a mold-cooling pit, and an elevator adapted to lower the mold-loaded cars into the pit and to raise them therefrom.

52. Apparatus of the character described, comprising mold-cars having rollers 52, a shaft 54, and gearing 53 adapted to rotate the rollers 52 simultaneously in opposite directions to propel the car-loads of molds correspondingly, a horizontal vulcanizer having interior rollers 36, a shaft 38, and gearing 51 adapted to rotate the rollers 36 simultaneously in opposite directions to transfer molds from the cars to the vulcanizer and back to the cars, detachable devices adapted to couple for simultaneous operation the shafts 38, 54 of the vulcanizer and cars, said vulcanizer also having rams 31 and opposing heads 32 between which the molds are compressed, a mold-cooling pit, and an elevator adapted to lower the mold-loaded cars into the pit and to raise them therefrom.

53. Apparatus of the character described, comprising mold-preparing tables, tracks 7 above the tables, mold-cars, traveling hoists running on the tracks 7 and adapted to load the molds from the tables to the cars and return the molds from the cars to the tables, a horizontal vulcanizer having interior rollers 36, a shaft 38, and gearing 51 adapted to rotate the rollers 36 simultaneously in opposite directions to transfer molds from the cars to the vulcanizer and back to the cars, said vulcanizer also having rams 31 and opposing heads 32 between which the molds are compressed, a mold-cooling pit, and an elevator adapted to lower the mold-loaded cars into the pit and to raise them therefrom.

54. Apparatus of the character described, comprising mold-preparing tables, tracks 7 above the tables, mold-cars having rollers 52, a shaft 54, and gearing 53 adapted to rotate the rollers 52 simultaneously in opposite directions to propel the car-loads of molds correspondingly, traveling hoists running on the tracks 7 and adapted to load the molds from the tables to the cars and return the molds from the cars to the tables, a horizontal vulcanizer having interior rollers 36, a shaft 38, and gearing 51 adapted to rotate the rollers 36 simultaneously in opposite directions to transfer molds from the cars to the vulcanizer and back to the cars, detachable devices adapted to couple for simultaneous operation the shafts 38, 54 of the vulcanizer and cars, said vulcanizer also having rams 31 and opposing heads 32 between which the molds are compressed, a mold-cooling pit, and an elevator adapted to lower the mold-loaded cars into the pit and to raise them therefrom.

55. Apparatus of the character described, comprising mold-cars, a horizontal vulcanizer having interior rollers 36, a shaft 38, and gearing 51 adapted to rotate the rollers simultaneously in opposite directions to transfer the molds from the cars to the vulcanizer and back to the cars, said vulcanizer also having rams 31 and opposing heads 32 between which the molds are compressed, a mold-cooling pit, and a double-decked elevator adapted to support on its lower deck the cars and the molds discharged upon them from the vulcanizer and to lower said cars with their loads of hot molds into the cooling-pit, said elevator being also adapted to receive on its upper deck cars loaded with newly-prepared molds ready for charging these molds from the cars into the vulcanizer.

56. Apparatus of the character described, comprising mold-cars having rollers 52, a shaft 54, and gearing 53 adapted to rotate the rollers 52 simultaneously in opposite directions to propel the car-loads of molds correspondingly, a horizontal vulcanizer having interior rollers 36, a shaft 38, and gearing 51 adapted to rotate the rollers 36 simultaneously in opposite directions to transfer molds from the cars to the vulcanizer and back to the cars, detachable devices adapted to couple for simultaneous operation the shafts 38, 54 of the vulcanizer and cars, said vulcanizer also having rams 31 and opposing heads 32 between which the molds are compressed, a mold-cooling pit, and a double-decked elevator adapted to support on its lower deck the cars and the molds discharged upon them from the vulcanizer and to lower said cars with their loads of hot molds into the cooling-pit, said elevator being also adapted to receive on its upper deck cars loaded with newly-prepared molds ready for charging these molds from the cars into the vulcanizer.

57. Apparatus of the character described, comprising mold-preparing tables, tracks 7 above the tables, mold-cars, traveling hoists running on the tracks 7 and adapted to load the molds from the tables to the cars and return the molds from the cars to the tables, a horizontal vulcanizer having interior rollers 36, a shaft 38, and gearing 51 adapted to rotate the rollers 36 simultaneously in opposite directions to transfer molds from the cars to the vulcanizer and back to the cars, said vulcanizer also having rams 31 and opposing heads 32 between which the molds are compressed, a mold-cooling pit, and a double-decked elevator adapted to support on its lower deck the cars and the molds discharged upon them from the vulcanizer and to lower said cars with their loads of hot molds into the cooling-pit, said elevator being also adapted to receive on its upper deck cars loaded with newly-prepared molds ready for charging these molds from the cars into the vulcanizer.

58. Apparatus of the character described, comprising mold-preparing tables, tracks 7 above the tables, mold-cars having rollers 52, a shaft 54, and gearing 53 adapted to rotate the rollers 52 simultaneously in opposite directions to propel the car-loads of molds correspondingly, traveling hoists running on the tracks 7 and adapted to load the molds from the tables to the cars and return the molds from the cars to the tables, a horizontal vulcanizer having interior rollers 36, a shaft 38, and gearing 51 adapted to rotate the rollers 36 simultaneously in opposite directions to transfer molds from the cars to the vulcanizer and back to the cars, detachable devices adapted to couple for simultaneous operation the shafts 38, 54 of the vulcanizer and cars, said vulcanizer also having rams 31 and opposing heads 32 between which the molds are compressed, a mold-cooling pit, and a double-decked elevator adapted to support on its lower deck the cars and the molds discharged upon them from the vulcanizer and to lower said cars with their loads of hot molds into the cooling-pit, said elevator being also adapted to receive on its upper deck cars loaded with newly-prepared molds ready for charging these molds from the cars into the vulcanizer.

59. Apparatus of the character described, comprising mold-preparing tables, tracks 7 above the tables, rails 14-20 on the table-floor, mold-cars adapted to said rails and having rollers 52, a shaft 54, and gearing 53 adapted to rotate the rollers 52 simultaneously in opposite directions to propel the car-loads of molds correspondingly, traveling hoists running on the tracks 7 and adapted to load the molds from the tables to the cars and return the molds from the cars to the tables, a horizontal vulcanizer having interior rollers 36, a shaft 38, and gearing 51 adapted to rotate the rollers 36 simultaneously in opposite directions to transfer molds from the cars to the vulcanizer and back to the cars, detachable devices adapted to couple for simultaneous operation the shafts 38, 54 of the vulcanizer and cars, said vulcanizer also having rams 31 and opposing heads 32 between which the molds are compressed, a mold-cooling pit, and a double-decked elevator 16 having upper-deck rails 18 and lower-deck rails 19 laid for alinement with the floor-rails 14-20, said elevator being adapted to support on its lower-deck rails 19 the cars and the molds discharged upon them from the vulcanizer and to lower said cars with their loads of molds into the cooling-pit, the elevator being also adapted to receive on its upper-deck rails 18 cars loaded with newly-prepared molds ready for charging these molds from the cars into the vulcanizer.

60. A horizontal vulcanizer having interior means adapted to automatically transfer molds into and out of it, combined with a mold-car having means adapted to automatically propel its load of molds, and means adapted to couple for simultaneous operation the car-load-propelling means and the vulcanizer-mold-transferring means.

61. A horizontal vulcanizer having an interior roller-carrier for the molds including means rotating the carrier-rollers simultaneously either forward or backward, combined with a mold-car having a roller-carrier including means for rotating its rollers simultaneously either forward or backward, and means adapted to couple for simultaneous operation the vulcanizer-mold-transferring roller-carrier and the car-load-propelling roller-carrier.

62. A horizontal vulcanizer having an interior-roller-carrier for the molds including a longitudinal shaft and gearing coupling the carrier-rollers to the shaft for simultaneous rotation either forward or backward, combined with a mold-car having a roller-carrier including a longitudinal shaft and gearing coupling the carrier-rollers to the shaft for simultaneous rotation either forward or backward, and a detachable coupling adapted to couple the roller-carrier shafts of the vulcanizer and car.

63. A horizontal vulcanizing-press having interior means adapted to automatically transfer molds into and out of it and also having interior means adapted to clamp a charge of molds and hold them closed during vulcanization of their contents, combined with a mold-car having means adapted automatically to propel its load of molds, and means adapted to couple for simultaneous operation the vulcanizer-mold-transferring means and the car-load-propelling means.

64. A horizontal vulcanizing-press having an interior roller-carrier for the molds including means rotating the carrier-rollers simultaneously either forward or backward, and also having interior means adapted to clamp a charge of molds and hold them closed during vulcanization of their contents, combined with a mold-car having a roller-carrier for the molds including means rotating the carrier-rollers simultaneously either forward or backward, and means adapted to couple for simultaneous operation the vulcanizer-mold-transferring roller-carrier and the car-load-propelling roller-carrier.

65. A horizontal vulcanizing-press having an interior roller-carrier for the molds including a longitudinal shaft and gearing coupling the carrier-rollers to the shaft for simultaneous rotation either forward or backward, and also having interior means adapted to clamp a charge of molds and hold them closed during vulcanization of their contents, combined with a mold-car having a roller-carrier for the molds including a longitudinal shaft and gearing coupling the carrier-rollers to the shaft for simultaneous rotation either forward or backward, and a detachable coupling adapted to couple the roller-carrier shafts of the vulcanizer and car.

66. A horizontal vulcanizing-press having interior means adapted automatically to transfer molds into and out of it and also having a series of rams and opposing heads between which molds may be held closed within the vulcanizing-chamber, combined with a mold-car having means adapted automatically to propel its load of molds, and means adapted to couple for simultaneous operation the vulcanizer-mold-transferring means and the car-load-propelling means.

67. A horizontal vulcanizing-press having an interior roller-carrier for the molds including means rotating the carrier-rollers simultaneously either forward or backward, and also having a series of rams and opposing heads between which molds may be held closed within the vulcanizing-chamber, combined with a mold-car having a roller-carrier for the molds including means rotating the carrier-rollers simultaneously either forward or backward, and means adapted to couple for simultaneous operation the vulcanizer-mold-transferring roller-carrier and the car-load-propelling roller-carrier.

68. A horizontal vulcanizing-press having an interior roller-carrier for the molds including a longitudinal shaft and gearing coupling the carrier-rollers to the shaft for simultaneous rotation either forward or backward, and also having a series of rams and opposing heads between which molds may be held closed within the vulcanizing-chamber, combined with a mold-car having a roller-carrier for the molds including a longitudinal shaft and gearing coupling the carrier-rollers to the shaft for simultaneous rotation either forward or backward, and a detachable coupling adapted to couple the roller-carrier shafts of the vulcanizer and car.

69. A horizontal vulcanizer having interior rollers 36, a shaft 38, and gearing 51, combined with a mold-car having rollers 52, a shaft 54, and gearing 53, and means adapted to couple the shafts 38, 54 for simultaneously rotating the vulcanizer and the car-rollers either forward or backward.

70. A horizontal vulcanizer having interior rollers 36, a shaft 38 having a splined coupling member 58–59 and a spring 63, and gearing 51 engaging the rollers 36 and shaft 38, combined with a mold-car having rollers 52 a shaft 54 having a coupling member 61, gearing 53 engaging the rollers 52 and shaft 54, and a grab-coupling 55 having end portions 61, 57 adapted to couple the vulcanizer and the car-shafts 38, 54, for assuring simultaneous operation of the roller-carriers of the vulcanizer and car.

EDWIN COUPLAND SHAW.

Witnesses:
ALVIN K. GOODWIN,
OLIVER WILLIAMS.